Patented Aug. 31, 1926.

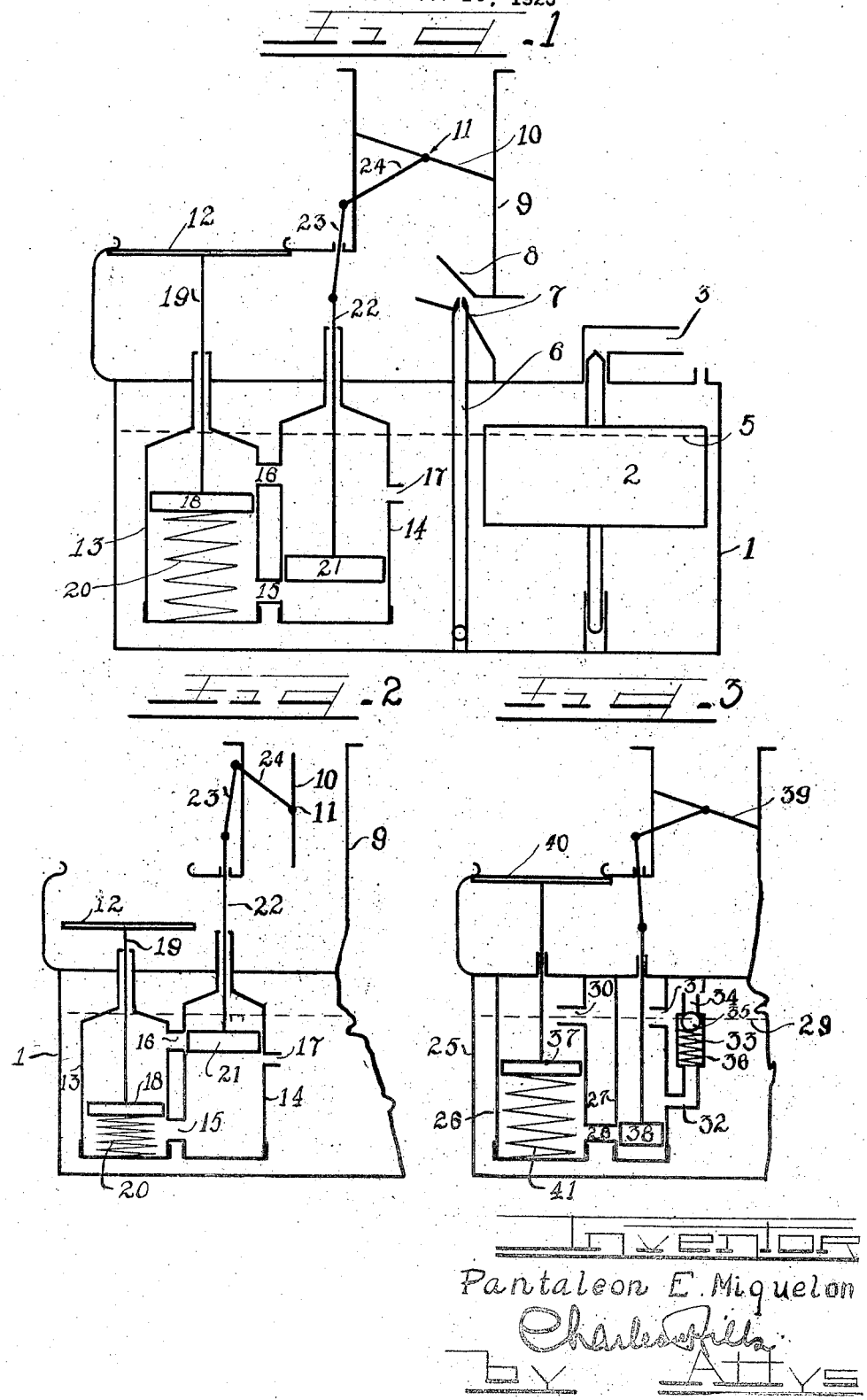

1,597,687

UNITED STATES PATENT OFFICE.

PANTALEON E. MIQUELON, OF CHICAGO, ILLINOIS.

CARBURETOR.

Application filed December 14, 1925. Serial No. 75,227.

This invention relates to carburetors for internal combustion engines and more particularly to a type of carburetor having an auxiliary air valve controlled by means of a dash pot.

Carburetors of this general type have not proved entirely satisfactory for the reason that the action of the dash pot slows down the opening of the auxiliary air valve to such an extent that the air valve does not respond sufficiently quickly to meet the sudden demand for additional air when the throttle is rapidly opened.

It is therefore an object of this invention to provide a carburetor of the auxiliary air valve and dash pot type in which the action of the dash pot is hydraulically controlled by the movement of the throttle, whereby the auxiliary air valve is caused to respond rapidly to the requirements of the engine.

It is a further object of this invention to provide a carburetor having a dash pot controlled auxiliary air valve in which the actuation of the air valve by the suction effect produced within the carburetor by a rapid flow of gas into the engine is supplemented by a positive hydraulic means controlled by the throttle.

Other and further important objects of this invention will be apparent from the disclosures in the specification and the accompanying drawings.

This invention (in a preferred form) is illustrated in the drawings and hereinafter more fully described.

On the drawings:

Figure 1 is an elevational diagrammatic view of a carburetor embodying the principles of my invention showing the throttle and auxiliary air valve in closed position.

Figure 2 is a reduced fragmentary view, the same as Figure 1, with throttle and auxiliary air valve open.

Figure 3 is a fragmentary view of a modified form of my device showing the throttle and auxiliary air valve in closed position.

As shown on the drawings:

The reference numeral 1 indicates the shell of a carburetor embodying the principles of my invention and adapted for use with internal combustion engines burning gasoline or similar volatile hydrocarbons. The carburetor is provided with a usual type of float 2 for controlling the flow of fuel into the carburetor through a fuel intake pipe 3. The float 2 maintains the liquid fuel in the carburetor at a normal level indicated by a dotted line 5 in accordance with the well known principles. A nozzle 6 having an orifice 7 opening into the throat of a venturi type of fixed air intake 8 leads the fuel from near the bottom of the carburetor. Said air intake 8 is located near the base of a pipe 9 leading to the engine. The flow of the fuel air mixture to the engine is regulated by a throttle 10 of usual butterfly type, mounted on a pivotal axis 11.

Up to this point the construction of the carburetor described embodies only well known principles. I have, however, in providing my carburetor with an auxiliary air valve 12 incorporated certain novel features in regard to the control of said auxiliary air valve, which will appear presently. Instead of connecting the auxiliary air valve with a dash pot of ordinary construction as is sometimes done to prevent fluttering of the auxiliary air valve, I have provided a double dash pot construction by means of which the auxiliary air valve may be in part hydraulically operated directly from the throttle. Such a double dash pot is shown in Figures 1 and 2 as comprising a plurality of cylinders 13 and 14 having a lower communication 15 and an upper communication 16 therebetween and an intermediate opening 17 in the cylinder 14 leading into the interior of the carburetor. Said opening 17 is positioned intermediate of the communications 15 and 16 for a purpose that will later appear. It will be noted that said opening 17 is below the normal liquid fuel level in the carburetor and therefore allows the fuel to enter the cylinders 13 and 14. A piston or plunger 18 connected to the auxiliary valve 12 by means of a rod 19 is adapted to be reciprocated in the cylinder 13. A spring 20 is positioned below the piston 18 and normally acts against said piston to hold the auxiliary air valve 12 in closed position. A second piston 21 reciprocally mounted in the cylinder 14 is connected by means of a series of links 22, 23 and 24 to the axis 11 of the throttle 10 in such a way that movement of the throttle 10 actuates said piston 21.

The action of the double dash pot may be best explained by describing its operation. Normally, when the throttle 11 is opened rapidly, there will be an increased suction of air and fuel into the engine, but as is well known, the proportion of fuel to air will be increased, so that additional air must be supplied to burn the fuel. Where an auxiliary air valve and a dash pot of the ordinary type is used, the opening of the auxiliary air valve due to the increased suction on opening the throttle will be slowed down by the action of the dash pot. Instead of therefore obtaining a quick and abundant supply of additional air, which is so necessary to effect a rapid acceleration of the engine when the throttle is opened, the rate of flow of additional air into the system will be so slow that the pick-up of the engine is substantially retarded. In the carburetor of my invention this difficulty is overcome by providing for piston actuation of the auxiliary air valve by the throttle acting through the hydraulic means provided by the double dash pot. When the auxiliary air valve 12 is closed as shown in Figure 1, the pistons 21 and 18 are in closed hydraulic communication. Consequently, when the throttle 10 is opened up, piston 21 is raised by means of the connecting links 22, 23 and 24, said link 24 being rigidly connected to the axis 11 of the throttle 10 and rotating therewith. Upward movement of the piston 21 therefore reduces the pressure on the underside of the piston 18 and causes said piston 18 to be lowered against the compression of the spring 20, thereby opening the auxiliary air valve 12. Said air valve 12 is continuously lowered until the pistons 18 and 21 assume the positions shown in Figure 2, the throttle 10 then being wide open. In this position it will be noted that the opening 17 is uncovered, thereby permitting a flow of liquid fuel into the space between the two pistons. The closed hydraulic connection between said pistons 18 and 21 is thereupon broken and the piston 18 is subject to the action of the spring 20 tending to force it upwardly. However, the upward movement of the piston 18 is retarded by the dash pot effect produced by closing the upper communication 16 by the piston 21. The auxiliary air valve 12 will accordingly close slowly, depending upon the rate at which the entrapped liquid leaks past the piston 18 and around the piston 21. The degree of suction within the pipe 9 will determine the amount which the auxiliary valve 12 will remain open, since the tendency of the spring 20 will be to close said valve. When the throttle 11 is being closed, the piston 21 is lowered below the opening 17 and this time exerts a positive hydraulic pressure upon the piston 18 to cause said piston 18 to rise and close the auxiliary valve 12. It will thus be seen that the closing of the auxiliary air valve is not dependent upon the spring alone, but is made positive by the hydraulic pressure set up by the piston 21. Furthermore it is evident that in my construction the auxiliary air valve will both be opened more rapidly and closed more rapidly in accordance with the movement of the throttle than is the case where a single dash pot construction is used.

In the modified form of my device illustrated in Figure 3 there is shown a carburetor casing or shell 25 of similar design to that already described. In this construction there are also two cylinders 26 and 27 positioned within the shell 25, but said cylinders have only a single communication 28 therebetween which is located near the bottom of said cylinders. At about the normal level of liquid within the carburetor, designated by the numeral 29, there are formed openings 30 and 31 in the cylinders 26 and 27 respectively. Intermediate said opening 31 and the communication 28, the cylinder 27 is provided with an elbow 32 connected with a ball valve 33. Said valve 33 comprises an enlarged piece of piping having a reduced opening 34 above the normal liquid level and provided with a ball 35 adapted to close said opening by means of the pressure exerted thereon by a spring 36. The purpose of this ball valve will hereinafter appear. As in my preferred type of carburetor, cylinders 26 and 27 are provided with pistons or plungers 37 and 38 respectively. The piston 38 is link connected to a throttle 39 and the piston 37 is rigidly connected to an auxiliary air valve 40.

The operation of my modified form of carburetor is substantially as follows. When the throttle is in closed position as shown in Figure 3, the piston 38 lies opposite the communication 28 and substantially closes the same. As the throttle 39 starts to open, the piston 38 begins its upward movement whereupon the communication 28 is opened up. The pistons 37 and 38 then being in closed hydraulic communication, a continued upward movement of the piston 38 due to the opening of the throttle 39 will cause a reduction of the pressure on the underside of the piston 37 and will consequently result in the piston 37 being drawn downwardly and the auxiliary valve 40 being opened. When the piston 38 has passed beyond the elbow 32, continued upward movement of said piston 38 will cause the ball valve 33 to open up and allow air to flow into the cylinder 27. The closed hydraulic communication between the pistons 37 and 38 will thereupon be broken and the piston 37 will be subjected only to the compressive force of the spring 41. At this stage, the position of the auxiliary air valve 40 will be dependent upon the differential between the suction effect tending to open said valve and the force of the spring 41 tending to close the valve. When the throttle 39 starts to close, the piston 38 will be forced downwardly and will immediately cause a pressure within the cylinder 27 and the elbow 32 which will close the ball valve 33. As soon as said ball valve 33 is closed, the continued downward movement of the piston 38 will exert a pressure against the lower surface of the piston 37, thereby causing said piston 37 to rise and the air valve 40 to close. It will be noted that during the closing of the air valve 40 there is a slight dash pot effect dependent upon the size of the opening 30 and the resistance offered by said opening to the escape of liquid from the cylinder 26. The closing of the auxiliary air valve 40 may be made more rapid by having the opening 30 larger and vice versa.

It will thus be seen that I have provided positive means for accelerating the opening and closing of the auxiliary air valve and it should further be noted that the rate of acceleration will depend upon and can be controlled by the size or relative height of the openings 17, 30, 31 and 34 and also of the communications, such as 15, 16 and 28 between the two cylinders of my double barrelled dash pot construction. The lag between the opening of the auxiliary air valve and the opening of the throttle, which has hitherto been a weak point in the ordinary dash pot type of carburetor, is in my construction entirely eliminated. The response of the auxiliary air valve, in my carburetor, to the movement of the throttle is so rapid that it permits the engine to pick up practically instantaneously. This is for the reason that no matter how rapidly the throttle may be opened, the auxiliary air valve will respond quickly enough to admit the required amount of air to efficiently burn the increased amount of fuel drawn into the engine.

It should be further noted that the synchronous movement of the auxiliary air valve and throttle which is assured by this invention, makes possible the maintenance of constant relative pressing conditions within the carburetor during acceleration or deceleration of the engine.

I am aware that many changes may be made, and numerous details of construction may be varied through a wide range without departing from the principles of this invention, and I therefore do not purpose limiting the patent granted hereon, otherwise than necessitated by the prior art.

I claim as my invention:

1. In a carburetor, a throttle, an auxiliary air valve, a dash pot controlled piston connected to said auxiliary air valve and hydraulic means actuated by opening movement of the throttle acting upon said piston to accelerate the movement of the auxiliary air valve.

2. In a carburetor, a throttle, an auxiliary air valve, a piston connected to said auxiliary air valve, a second piston connected to said throttle in hydraulic communication with said first piston and means controlling said hydraulic communication whereby movement of said throttle actuates said auxiliary air valve through a predetermined distance.

3. In a carburetor, a throttle, an auxiliary air valve, intercommunicating cylinders opening into the interior of said carburetor below the normal level of liquid fuel therein and pistons adapted to operate in said cylinders and connected to said auxiliary air valve and said throttle respectively, whereby movement of said throttle is hydraulically translated into movement of said auxiliary air valve.

4. In a carburetor, a throttle, an auxiliary air valve, intercommunicating cylinders opening into the interior of said carburetor below the normal level of liquid fuel therein and pistons adapted to operate in said cylinders and connected to said auxiliary air valve and said throttle respectively, whereby movement of said throttle is hydraulically translated into movement of said auxiliary air valve, and resilient means tending to close said auxiliary air valve.

5. In a carburetor, a throttle, an auxiliary air valve, a double barreled dash pot having communications between the two barrels and with liquid fuel in the interior of the carburetor and plungers in said barrels connected to said auxiliary air valve and said throttle respectively, said communications being so arranged that movement of said throttle and connected plunger is translated through the liquid in said dash pots into movement of said other plunger and connected air valve through a predetermined length of stroke of said plungers.

6. In a carburetor, a throttle, an auxiliary air valve, a dash pot controlled piston connected to said auxiliary air valve, resilient means tending to hold said air valve in closed position and hydraulic means actuated by opening movement of said throttle acting upon said piston to compress said resilient means and actuated by closing movement of said throttle to supplement the action of said resilient means.

7. In a carburetor, a throttle, an auxiliary air valve, a plurality of cylinders having an upper and lower communication therebetween and an opening in one of said cylinders intermediate the levels of said communications and plungers in said cylinders connected to said throttle and to said auxiliary air valve respectively, said throttle connected plunger being above said lower communication when said throttle is closed and abreast of said upper communication when said throttle is wide open.

8. In a carburetor, a throttle, an auxiliary air valve, a spring pressed piston connected to said auxiliary air valve and hydraulic means actuated by movement of the throttle acting upon said piston to open and close said auxiliary air valve.

9. In a carburetor, a throttle, an auxiliary air valve, plungers connected to said throttle and to said auxiliary air valve respectively and in hydraulic communication with each other, and means modifying said communication whereby movement of the throttle and connected plunger hydraulically controls in part the movement of the other plunger and connected air valve.

In testimony whereof I have hereunto subscribed my name.

PANTALEON E. MIQUELON.